United States Patent Office 3,301,688
Patented Jan. 31, 1967

3,301,688

BONDING COMPOSITIONS

Clyde S. Simpelaar, Racine, Wis., assignor to Modine Manufacturing Company, a corporation of Wisconsin No Drawing. Filed Oct. 11, 1965, Ser. No. 494,968
16 Claims. (Cl. 106—1)

This invention relates to improved bonding compositions for bonding metal and particularly aluminum or magnesium, and is a continuation-in-part of my copending application Serial No. 424,211, filed January 8, 1965, which was a continuation-in-part of my application Serial No. 150,889, filed November 8, 1961, both applications now abandoned.

The composition of the present invention contains a bonding metal compound comprising zinc halide reacted with a special type solvent so that without agitation the compound does not settle out appreciably for relatively long periods of time. The liquid bonding composition of this invention is generally either clear or translucent, with substantially no large particles in suspension.

One advantage of this invention is that the bonding metal is deposited from a chemical compound of the metal and therefore is in an extremely high state of purity. As is well known, bonds of this type depend in large degree upon a high state of purity of the bonding metal to achieve satisfactory results.

Another advantage of depositing the bonding metal from a chemical compound of the metal is that smaller amounts of bonding may be used. This not only reduces the weight of the final structure but also permits bonding of extremely light gauge base metal structures without alloying through the thin metal. This was not previously feasible because the suspended particles of prior liquid bonding compositions tended to gather in certain areas particularly in intricate structures such as heat exchangers. Because smaller amounts of the bonding material may be used, the cost is greatly reduced and cleaner and brighter joints are obtained. As most of the chemical compounds (and especially the zinc halides) used in the compositions of this invention react with the solvent used, a uniform or homogeneous bonding liquid is obtained. Furthermore, use of a reactant-solvent substantially reduces evaporation losses and flammability.

One of the features of the invention therefore is to provide an improved composition for bonding base metals together wherein the bonding compounds, including zinc halide, are in a relatively non-settling condition in a liquid, the bonding metal or metals are obtained during the bonding process from the compound, and sufficient heat is available, either applied or developed, to melt at least one of the metals at the bond.

Other features and advantages of the invention will be apparent from the following description of the invention and certain embodiments thereof.

In this invention at least one of the base metals must be anodic with respect to the zinc and other bonding metals of the bonding salts. In such instances, the base metal or metal alloy will replace the zinc and any other bonding metal present from the salt which will then join with the base metal or metal alloy to form the bond. Electron probe analysis shows that the zinc and other metals in the composition that are reduced from their salts alloy with the base metal. The homogeneity of the liquid bonding composition results in the metals of the bond being uniformly distributed therethrough. Sufficient heat must be available to cause this alloying, and this heat may be applied or may be generated in an exothermic reaction following applied heat.

The preferred base metals or metal and metal alloys that are bonded together by the compositions of this invention are aluminum and/or magnesium to metals or alloys such as aluminum, copper, iron, nickel, zinc, magnesium, cadmium, silver, and alloys thereof.

The principal bonding compound or salt is zinc halide as the aluminum and magnesium from the base metal each replaces zinc which is then available for alloying with the base metal to form the bond. A readily available and efficient zinc halide is zinc chloride.

The bonding compositions of this invention in addition to the zinc halide as above disclosed also include a reactant-solvent. These solvents are those that have Lewis base characteristics and that react with the zinc halide to form complexes which in proper amounts do not materially settle out of the liquid over considerable periods of time. The amount of zinc halide in the composition is at least about 10% by weight of the liquid composition (and preferably at least about 40% by weight of the composition) with the maximum amount being limited only by the reactivity of zinc halide with the solvent. Thus, the ultimate amount of zinc halide is that required to form a saturated solution.

The organic solvents having the characteristics of a Lewis base that are useful with the bonding compounds and particularly the zinc halides of this invention are compounds that function as electron donors to form coordinate complexes with the zinc halide. The following are useful solvents for making the liquid bonding compositions of this invention.

*Ketones.*—The most important ketones are the saturated aliphatic of the formula $C_nH_{2n}O$ where $n$ equals 3 to 12. Typical ketones are acetone, methyl ethyl ketone, methyl isopropyl ketone, di-isopropyl ketone, methyl isoamyl ketone, diethyl ketone, 2-heptanone, methyl isobutyl ketone, 3-heptanone, 2-undecanone and isobutyl heptyl ketone, of which the first four are preferred.

Liquid 1–4 diketones are also useful solvents. An example of these is 2–5 hexanedione.

Another group of ketones is the liquid unsaturated aliphatic compounds having only one unsaturated bond in the molecule of which mesityl oxide is an example.

Liquid cyclic aliphatic ketones may also be used of which cyclohexanone is an example.

*Alcohols.*—The alcohols include saturated aliphatic alcohols of the formula $C_nH_{2n+1}OH$ where $n$ is 1 to 6. Examples of such alcohols are methyl alcohol, ethyl alcohol, isopropyl alcohol, tert.-butyl alcohol, n-amyl alcohol, sec-butyl alcohol and 1-hexanol of which the first three are preferred.

Olefinic alcohols of the formula $C_nH_{2n-1}OH$ may also be used with $n$ being 3 to 6. A good example of such alcohols is allyl alcohol.

Another group of alcohols are the heteroalkyl alcohols of which tetrahydrofurfuryl alcohol is an example.

Halogen substituted aliphatic alcohols such as chlorosubstituted alcohols may be employed. Examples of these are 2-chloroethanol, 1-chloro-2-propanol, 2-chloro-1-propanol and 3-chloro-2-butanol.

*Aldehydes.*—An excellent aliphatic aldehyde composition for use as a solvent is an aqueous solution of formaldehyde or formalin. Customarily, formalin contains about 37% of formaldehyde in water solution.

*Water.*—Water is an excellent solvent for use in the bonding compositions of this invention. This is particularly true if the water solutions are freshly prepared and not carried over to the next day. This is preferrd because the zinc halide tends to hydrolyze on standing for a considerable period of time resulting in loss of zinc from the solution by precipitating in the form of the zinc oxide or hydroxide.

*Nitriles.*—Aliphatic nitriles of the formula $C_nH_{2n+1}CN$ where $n$ equals 1 to 6 are excellent solvents for the compositions of this invention. Examples of such nitriles are butyronitrile and acetonitrile. Unsaturated nitriles of the formula $C_nH_{2n-1}CN$ where $n$ is 2 to 6 may also be used. Such nitriles include acrylonitrile, crotononitrile and allyl cyamide.

*Esters.*—Certain liquid esters of saturated acids are also excellent solvent. These esters include the methyl and ethyl esters of aliphatic acids of 1 to 8 carbon atoms and formates and acetates of aliphatic alcohols of 1 to 5 carbon atoms. Thus, the methyl and ethyl esters are those of acids from formic through caprylic, while the formates and acetates are those from methyl alcohol through amyl. Examples of useful esters include ethyl butyrate, ethyl formate, methyl caprylate and the formates and acetates of methyl alcohol, ethyl alcohol, n-propyl and i-propyl alcohol, n-butyl and i-butyl alcohol and n-amyl and i-amyl alcohol. Other usable esters include esters of chloroacetic acid and unsaturated acids such as methyl acrylate and methyl methacrylate. Orthoesters, such as the methyl and ethyl esters of orthoformic, orthoacetic, and orthopropionic acids are also excellent solvents.

*Lactones.*—Lactones having 3 to 4 methylene groups in the ring are excellent solvents in the compositions of this invention. Examples are gamma-butyrolactone and gamma- and delta-valerolactone.

*Ethers.*—Certain ethers may also be used as solvents in this invention. These include cyclic ethers such as tetrahydrofuran. Alcohol ethers such as aliphatic alcohol ethers of 1 to 4 carbon atoms in the alkoxyl and alcohol groups are also useful solvents. Examples include 2-butoxyethanol and methoxy isopropanol.

These solvents may be used alone or in mixtures. Furthermore, they may be unsubstituted or substituted, particularly with halogen groups, so long as the functional group is not inhibited by the substituent, in other words, so long as the ketone continues to function as a ketone, the alcohol as an alcohol, nitrile as a nitrile and the like.

An excellent example of a mixture of compounds used as a solvent is a product known as methyl acetone. This is a mixture of acetone, methyl acetate and methyl alcohol. Another such mixture is one comprising 20% methyl isobutyl ketone and 80% acetone. Another such mixture is known as Synasol solvent which is a mixture of low boiling point alcohols.

The bonding compositon of this invention includes the special reactant-solvent as identified above, the bonding metal salt and an additive metal salt primarily for corrosion resistance. The metals of these additive salts include antimony, barium, cesium, copper, chromium, iron, manganese, silicon, and zirconium used in the form of their halide, and preferably chloride, salts and may be used as indicated or in combination with each other.

Normally and preferably, at least one fluxing salt of types that are well known in the art is also used, but in a considerably smaller amount than heretofore used.

An excellent bonding composition according to this invention to produce a corrosion resistant bond specifically comprises about 22.5–37.5 parts of a liquid solvent as defined above, about 37.5 parts of a zinc halide, about 0.12–1.69 parts of one or a mixture of the additive metal halides described above, and about 0.9–1.5 parts of an ammonium halide flux where necessary. The composition contains at least about 10% and preferably at least 40% by weight of the composition of the zinc halide, and about 0.3–0.6 part of an alkali metal halide flux such as lithium fluoride or sodium fluoride.

The zinc halide salt may be zinc chloride, although the bromide and iodide salts may also be used. The additive metal salt as described above, where used, of the metal that alloys with the bonding metal may comprise a halide salt such as the chloride or fluoride, either in anhydrous or hydrated form. The quantity of the additive metal halide provided in the composition to produce a corrosion resistant bond is preferably such as to provide additive metal in the bond in an amount of about 0.25–3.5% of the zinc therein. Sufficient additive metal halide in the composition to provide additive metal in the amount of approximately 2% of the amount of the metallic zinc of the bond has been found to provide a highly effective corrosion resistant bond.

The preferred ammonium halide fluxing agent comprises ammonium chloride. Ammonium bromide and ammonium iodide may also be used in lieu of the ammonium chloride but appear to offer no particular advantages thereover and are more expensive.

Sodium fluoride comprises a preferred additional fluxing agent utilized in conjunction with the ammonium halide salt. Other fluxing agents, where used, include sodium iodide, sodium bromide, potassium acid fluoride, sodium acid fluoride, potassium fluoride and lithium fluoride.

*Example 1*

A liquid composition was produced by first adding 37.5 pounds of zinc chloride to 22.5 pounds of methyl ethyl ketone. After stirring for about an hour to complete, the reaction, a mixture of 0.75 pound crystalline copper fluoride, 1.2 pounds ammonium fluoride and 0.45 pound sodium fluoride were added and stirring was continued until substantially homogeneous. An assembled aluminum radiator core was dipped into the liquid, the excess drained and the core then heated in a 500–650° F. oven to displace the zinc and copper from their salts thereby bonding the metal parts together by utilizing the exothermic heat developed during the reduction of the salts to produce uniform heating at the bond site even in complex internal structures where heat from an external source is difficult to apply uniformly.

*Example 2*

The same procedure was followed as in Example 1 but here 0.12 pound of crystalline copper chloride was substituted for the crystalline copper fluoride.

*Example 3*

The same procedure was followed as in Example 1 but here 0.48 pound of crystalline copper chloride was used in lieu of the crystalline copper fluoride.

*Example 4*

The same procedure was followed as in Example 1 but here the formulation was as follows: 37.5 pounds zinc chloride, 0.76 pound anhydrous copper chloride, 1.5 pounds ammonium chloride, 0.6 pound sodium fluoride and 22.5 pounds of the ketone.

*Example 5*

The same procedure was followed as in Example 1 but here the formulation was as follows: 37.5 pounds zinc chloride, 0.35 pound crystalline copper fluoride, 0.9 pound ammonium chloride, 0.3 pound sodium fluoride and 22.5 pounds of the ketone.

*Example 6*

The same procedure was followed as in Example 1 but here the formulation was as follows: 37.5 pounds zinc chloride, 1.69 pounds crystalline copper chloride, 1.5 pounds ammonium chloride, 0.6 pound sodium fluoride and 37.5 pounds of the ketone.

*Example 7*

The same procedure was followed as in Example 1 but here the formulation was as follows: 37.5 pounds zinc chloride, 0.09 pound anhydrous copper chloride, 1.2 pounds ammonium chloride, 0.45 pound sodium fluoride and 22.5 pounds of the ketone.

*Example 8*

In this example the liquid composition was produced by adding each of the salts of Example 1 concurrently to the ketone solvent.

*Example 9*

The same procedure was followed as in Example 1 but acetone was substituted for the methyl ethyl ketone.

*Example 10*

Here the same procedure was followed as in Example 5 but the ketone was acetone.

*Example 11*

The same procedure was followed as in Example 7 but the ketone was acetone.

*Examples 12–19*

In these examples the same procedure was followed as in Example 1 except the copper fluoride was substituted in these examples by the chlorides of antimony, barium, cesium, chromium, iron, manganese, manganese plus copper, and zirconium, respectively.

*Example 20*

In this example a liquid composition was produced by first adding 37.5 pounds of zinc chloride to 22.5 pounds of methyl ethyl ketone. After stirring for about one hour to complete the reaction a mixture of 1.2 pounds of ammonium fluoride and 0.45 pound of sodium fluoride was added and stirring was continued until substantially homogeneous. An article of assembled, contacting magnesium parts was dipped into the liquid, the excess liquid drained off and the article with the retained liquid heated in a 500–650° F. oven to displace the zinc from its chloride by the base magnesium, thereby bonding the metal parts together by utilizing the exothermic heat developed during the reduction of the zinc chloride.

The bonding composition of this invention may be applied by any suitable means such as by dipping, brushing, spraying or the like. Subsequent to the application of the bonding composition to the material, the material is heated as by placement in a suitable oven heated to produce a bonding temperature which is preferably approximately in the range of 500° F. to 1500° F. oven temperature. The heat is applied heat plus the exothermic heat of reaction.

Various theories of operation are described herein. As they are theories only and their accuracy is not necessary to an understanding of the invention, I do not wish to be bound or limited by these theories.

All parts, amounts and proportions herein are by weight.

Having described my invention as related to the embodiments set out herein, it is my intention that the invention be not limited by any of the details of description, unless otherwise specified, but rather be construed broadly within its spirit and scope as set out in the accompanying claims.

I claim:

1. An essentially liquid bonding composition substantially free of solids other than those of colloidal size and smaller for bonding a selected metal of the class consisting of aluminum, magnesium and alloys thereof to another base metal, consisting essentially of: a fluxing salt; a liquid solvent having the characteristics of a Lewis base toward zinc halide as a Lewis acid by forming with said zinc halide a coordinate complex decomposing on heating while in contact with said selected metal to yield zinc; and an amount of zinc halide between about 10% of said composition and substantially complete saturation of said solvent whereby exothermic heat will develop during said bonding, said zinc halide being a member of the class consisting of zinc chloride, zinc bromide and zinc iodide.

2. The composition of claim 1 wherein said base metal is anodic with respect to the zinc of said zinc halide.

3. The composition of claim 1 wherein said base metal is selected from the class consisting of aluminum, copper, iron, nickel, zinc, magnesium, cadmium, silver, and alloys thereof.

4. An essentially liquid bonding composition substantially free of solids other than those of colloidal size and smaller for bonding a selected metal of the class consisting of aluminum, magnesium and alloys thereof to another base metal, consisting essentially of: a fluxing salt; a liquid solvent having the characteristics of a Lewis base toward zinc halide as a Lewis acid by forming with said zinc halide a coordinate complex decomposing on heating while in contact with said selected metal to yield zinc; an amount of zinc halide between about 10% of said composition and substantially complete saturation of said solvent; and an amount of an additive metal in the form of a halide salt effective to retard corrosion in the resulting bond, said additive metal halide being present in an amount sufficient to provide additive metal in said bond in an amount of about 0.25–3.5% of the zinc in said bond, and said additive metal being selected from the class consisting of antimony, barium, cesium, chromium, copper, iron, manganese, silicon, zirconium, and mixtures thereof, whereby exothermic heat will develop during said bonding, said zinc halide being a member of the class consisting of zinc chloride, zinc bromide and zinc iodide.

5. The composition of claim 4 wherein said base metal is anodic with respect to zinc and the additive metal.

6. An essentially liquid bonding composition substantially free of solids other than those of colloidal size and smaller for bonding a selected metal of the class consisting of aluminum, magnesium and alloys thereof to another base metal, consisting essentially of: a fluxing salt; a liquid solvent having the characteristics of a Lewis base toward zinc halide as a Lewis acid by forming with said zinc halide a coordinate complex decomposing on heating while in contact with said selected metal to yield zinc and selected from the class consisting of aliphatic ketones of 3–12 carbon atoms, aliphatic alcohols of 1–6 carbon atoms, aqueous formaldehyde, water, aliphatic nitriles of 1–6 carbon atoms, methyl and ethyl esters of aliphatic acids of 1–8 carbon atoms and formates and acetates of aliphatic alcohols of 1–5 carbon atoms, aliphatic lactones having 3–4 methylene groups in the ring, tetrahydrofuran, and aliphatic alcohol ethers having 1–4 carbon atoms in the alkoxyl and alcohol groups; and an amount of zinc halide between about 10% of said composition and substantially complete saturation of said solvent, whereby exothermic heat will develop during said bonding, said zinc halide being a member of the class consisting of zinc chloride, zinc bromide and zinc iodide.

7. The composition of claim 6 wherein said base metal is anodic with respect to the zinc of said zinc halide.

8. An essentially liquid bonding composition substantially free of solids other than those of colloidal size and smaller for bonding a selected metal of the class consisting of aluminum, magnesium and alloys thereof to another base metal, consisting essentially of: a fluxing salt; a liquid solvent having the characteristics of a Lewis base toward zinc halide as a Lewis acid by forming with said zinc halide a coordinate complex decomposing on heating while in contact with said selected metal to yield zinc and selected from the class consisting of aliphatic ketones of 3–12 carbon atoms, aliphatic alcohols of 1–6 carbon atoms, aqueous formaldehyde, water, aliphatic nitriles of 1–6 carbon atoms, methyl and ethyl esters of aliphatic acids of 1–8 carbon atoms and formates and acetates of aliphatic alcohols of 1–5 carbon atoms, aliphatic lactones having 3–4 methylene groups in the ring, tetrahydrofuran, and aliphatic alcohol ethers having 1–4 carbon atoms in the alkoxyl and alcohol groups; an amount of zinc halide between about 10% of said composition and substantially complete saturation of said solvent; and an amount of an additive metal in the form of a halide salt effective to retard corrosion in the resulting bond, said additive metal halide being present in an amount sufficient to provide additive metal in said bond in an amount of about 0.25–3.5% of the zinc in said bond, and said additive metal being selected from the class consisting of antimony, barium, cesium, chromium, copper, iron, manganese, silicon, zirconium, and mixtures thereof, whereby exothermic heat will develop during said bonding, said zinc halide being a member of the class consisting of zinc chloride, zinc bromide and zinc iodide.

9. The composition of claim 8 wherein said base metal is anodic with respect to the zinc of said zinc halide.

10. An essentially liquid bonding composition made up substantially entirely of solids of colloidal size and smaller including dissolved solids and providing a copper-zinc-aluminum alloy bond that is resistant to corrosion by naturally occurring corrosive water and automotive system coolants for bonding aluminum articles, said composition consisting essentially of a mixture in the stated proportions by weight of about 37.5 parts of zinc halide, about 0.12–1.69 parts of copper halide, about 0.9–1.5 parts of ammonium halide fluxing agent and about 0.3–0.6 part of sodium fluoride fluxing agent with about 22.5–37.5 parts of a liquid aliphatic ketone, said halides being in solution and in chemical complexes with the ketone, said metallic bonding alloy being provided by the zinc from said zinc halide and copper from said copper halide for combining with aluminum from said articles to produce said copper-zinc-aluminum bonding alloy, said zinc halide and said copper halide being present in effective amounts to thusly provide said zinc and copper, respectively, and said fluxing agents being present in effective fluxing amounts, said zinc halide being a member of the class consisting of zinc chloride, zinc bromide and zinc iodide.

11. The bonding composition of claim 10 wherein said zinc halide comprises zinc chloride.

12. The bonding composition of claim 10 wherein said copper halide is a member of the group consisting of copper chloride and copper fluoride.

13. The bonding composition of claim 10 wherein said ammonium halide is a member of the group consisting of ammonium chloride, ammonium bromide and ammonium iodide.

14. The bonding composition of claim 10 wherein said aliphatic ketone has a molecular weight not more than 182.

15. An essentially liquid bonding composition made up substantially entirely of solids of colloidal size and smaller including dissolved solids and providing a copper-zinc-aluminum alloy bond that is resistant to corrosion by naturally occurring corrosive water and automotive system coolants for bonding aluminum articles, said composition consisting essentially of a mixture in the stated proportions by weight of about 37.5 parts of zinc chloride, about 0.12–1.69 parts of a copper halide from the group consisting of copper chloride and copper fluoride, about 0.9–1.5 parts of ammonium halide fluxing agent selected from the group consisting of ammonium chloride, ammonium bromide and ammonium iodide, and about 0.3–0.6 part of sodium fluoride fluxing agent with about 22.5–37.5 parts of an aliphatic ketone having a molecular weight not more than 182, said metallic bonding alloy being provided by the zinc from said zinc halide and copper from said copper halide for combining with aluminum from said articles to produce said copper-zinc-aluminum bonding alloy, said zinc halide and said copper halide being present in effective amounts to thusly provide said zinc and copper, respectively, and said fluxing agents being present in effective fluxing amounts.

16. An essentially liquid bonding composition made up substantially entirely of solids of colloidal size and smaller including dissolved solids and providing a copper-zinc-aluminum alloy bond that is resistant to corrosion by naturally occurring corrosive water and automotive system coolants for bonding aluminum articles, said composition consisting essentially of a mixture in the stated proportions by weight of about 37.5 parts of zinc halide, about 0.75 part of copper fluoride, about 1.2 parts of ammonium chloride fluxing agent and about 0.45 part of sodium fluoride fluxing agent with about 22.5 parts of methyl ethyl ketone, said metallic bonding alloy being provided by the zinc from said zinc halide and copper from said copper fluoride for combining with aluminum from said articles to produce said copper-zinc-aluminum bonding alloy, said zinc halide and said copper fluoride being present in effective amounts to thusly provide said zinc and copper, respectively, and said fluxing agents being present in effective fluxing amounts, said zinc halide being a member of the class consisting of zinc chloride, zinc bromide and zinc iodide.

References Cited by the Examiner

UNITED STATES PATENTS

| | | | |
|---|---|---|---|
| 2,867,037 | 1/1959 | Lawton | 148—26 |
| 3,147,154 | 9/1964 | Cole et al. | 117—130 |

ALEXANDER H. BRODMERKEL, *Primary Examiner.*

L. HAYES, *Assistant Examiner.*